US007735634B2

(12) United States Patent
Miyazaki et al.

(10) Patent No.: US 7,735,634 B2
(45) Date of Patent: Jun. 15, 2010

(54) BELT DEVICE AND IMAGE FORMING APPARATUS

(75) Inventors: Takafumi Miyazaki, Osaka (JP); Mitsutoshi Kichise, Osaka (JP); Tomoya Adachi, Hyogo (JP); Takeshi Yamashita, Osaka (JP)

(73) Assignee: Ricoh Company, Ltd., Tokyo (JP)

( * ) Notice: Subject to any disclaimer, the term of this patent is extended or adjusted under 35 U.S.C. 154(b) by 53 days.

(21) Appl. No.: 12/135,490

(22) Filed: Jun. 9, 2008

(65) Prior Publication Data

US 2009/0014288 A1 Jan. 15, 2009

(30) Foreign Application Priority Data

Jul. 13, 2007 (JP) ............................ 2007-185014
Dec. 28, 2007 (JP) ............................ 2007-341296

(51) Int. Cl.
*B65G 39/16* (2006.01)

(52) U.S. Cl. ...................................... 198/806; 198/807

(58) Field of Classification Search ................. 198/806, 198/807, 810.03, 840
See application file for complete search history.

(56) References Cited

U.S. PATENT DOCUMENTS 2,725,757 A * 12/1955 Murphy ...................... 198/806
4,196,803 A * 4/1980 Lovett ........................ 198/806
4,506,782 A * 3/1985 Jeanneret et al. ............ 198/806
7,059,467 B2 * 6/2006 Sands et al. ................. 198/840
2006/0210326 A1 9/2006 Takehara et al.
2006/0210327 A1 9/2006 Iwakura et al.
2007/0160396 A1 7/2007 Adachi et al.
2007/0231023 A1 10/2007 Miyazaki

FOREIGN PATENT DOCUMENTS

JP 5-134486 5/1993
JP 11-161055 6/1999
JP 3223771 8/2001
JP 3310338 5/2002
JP 3523503 2/2004
JP 2004-226746 8/2004
JP 3837246 8/2006

OTHER PUBLICATIONS

U.S. Appl. No. 12/135,460, filed Jun. 9, 2008, Adachi, et al.
U.S. Appl. No. 12/142,354, filed Jun. 19, 2008, Kichise, et al.
U.S. Appl. No. 12/171,613, filed Jul. 11, 2008, Adachi, et al.

* cited by examiner

*Primary Examiner*—James R Bidwell
(74) *Attorney, Agent, or Firm*—Oblon, Spivak, McClelland, Maier & Neustadt, L.L.P.

(57) ABSTRACT

A belt including a first roller is supported by a plurality of rollers, and is driven to rotate in a predetermined direction. An abutting member makes contact with at least one edge of the belt in its width direction. A pressing member applies a pressure on an extended surface of the belt in its thickness direction at a position near a contact portion of the belt with the abutting member and on an upstream side of the contact portion in its moving direction.

14 Claims, 6 Drawing Sheets

BELT DEVICE AND IMAGE FORMING APPARATUS

CROSS-REFERENCE TO RELATED APPLICATIONS

The present application claims priority to and incorporates by reference the entire contents of Japanese priority documents, 2007-185014 filed in Japan on Jul. 13, 2007 and 2007-341296 filed in Japan on Dec. 28, 2007.

BACKGROUND OF THE INVENTION

1. Field of the Invention

The present invention relates to a belt device and an image forming apparatus, and more particularly, to a belt control mechanism for controlling a bias applied to a belt.

2. Description of the Related Art

In a typical image forming apparatus, such as a printer, a copier, a facsimile machine, and a printing press, an endless belt is used as a latent-image carrier, a transfer medium, or a conveying member for conveying a recording medium such as a sheet. Such a belt is generally supported by a plurality of rollers, and moves in a predetermined direction in accordance with rotation of any one of the rollers.

Namely, the belt moves by having frictional contact with the rollers. While the belt is moving, it may happen that the belt meanders by the friction in an axial direction of the rollers, a tilt of an axis line, or the like. In this case, the meandering of the belt means that the belt moves by being biased toward either one side of the belt in a width direction parallel to the axial direction of the rollers.

When a full-color image is formed by a color image forming apparatus capable of forming any of a monochrome image and a full-color image selectively, a plurality of different color toner images are transferred onto a transfer belt in a superimposed manner. However, if the transfer belt meanders, each of the toner images cannot be transferred onto a predetermined transfer position on the transfer belt, and thus an error such as a color registration error occurs in a formed image.

To prevent such a meandering of a belt, various methods have been developed. For example, in a conventional technology disclosed in Japanese Patent No. 3523503, a blocking member is integrally fixed to a rear surface of the belt at a position close to an end face of a roller. If the belt meanders, the blocking member collides with the end face of the roller. Therefore, it is possible to prevent the belt from being biased toward either one side in the width direction.

Furthermore, for example, in conventional technologies disclosed in Japanese Patent Application Laid-open No. HO5-204199, Japanese Patent Application Laid-open No. 2004-226746, and Japanese Patent Application Laid-open No. H11-161055, in addition to such a blocking member, a belt is pressed so as to prevent the belt from running on to an outer circumferential surface of a roller.

Moreover, for example, in conventional technologies disclosed in Japanese Patent No. 3223771 and Japanese Patent Application Laid-open No. H05-134486, instead of a blocking member, a flange is provided on both ends of a roller in an axial direction so that a belt is prevented from meandering by the flange.

In this configuration in which the flange is provided on the ends of the roller, although it is possible to avoid an impact caused when the blocking member collides with the end face of the roller, there are some problems as explained below.

If there is a positional tolerance among the rollers supporting the belt or a deviation of the tension applied to the belt in the axial direction of the rollers due to a tilt of an axis line of each of the rollers, an excess bias force in the width direction of the belt occurs. Furthermore, such an excess bias force occurs when each of the rollers differs in a coefficient of friction in the axial direction.

When the belt is excessively biased in the width direction, and struck on the flange, the belt is buckled. If such a state that the belt is buckled is continued for a long time, the durability of the belt is impaired. It is possible to use a high stiffness belt in consideration of the durability of the belt; however, a cost increases.

SUMMARY OF THE INVENTION

It is an object of the present invention to at least partially solve the problems in the conventional technology.

According to an aspect of the present invention, there is provided a belt device including a belt that is supported by a plurality of rollers, and is driven to rotate in a predetermined direction, the rollers including a first roller; an abutting member that makes contact with at least one edge of the belt in its width direction; and a pressing member that applies a pressure on an extended surface of the belt in its thickness direction at a position near a contact portion of the belt with the abutting member and on an upstream side of the contact portion in its moving direction.

Furthermore, according to another aspect of the present invention, there is provided an image forming apparatus including a belt device that includes a belt that is supported by a plurality of rollers, and is driven to rotate in a predetermined direction, the rollers including a first roller, an abutting member that makes contact with at least one edge of the belt in its width direction, and a pressing member that applies a pressure on an extended surface of the belt in its thickness direction at a position near a contact portion of the belt with the abutting member and on an upstream side of the contact portion in its moving direction.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Exemplary embodiments of the present invention are explained in detail below with reference to the accompanying drawings.

Figure 1:
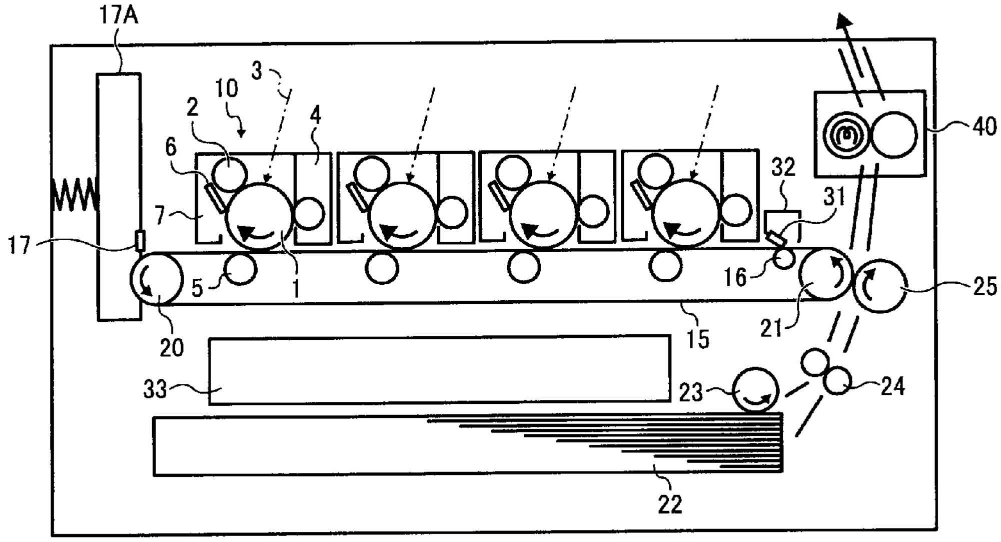
FIG. 1 is a schematic diagram of an image forming apparatus including a belt device according to an embodiment of the present invention.

FIG. 1 is a schematic diagram of a full-color image forming apparatus including a belt device according to an embodiment of the present invention. The image forming apparatus uses a belt as a transfer medium. A plurality of different color toner images are sequentially transferred onto the belt in a superimposed manner, and thereby forming a full-color image.

Reference numeral 1 denotes a cylindrical photosensitive drum as a latent image carrier. The photosensitive drum 1 is 24 mm in diameter, and rotates at a circumferential speed of 120 mm/s.

Reference numeral 2 denotes a roller-shaped charging unit. The charging unit 2 is pressed against a surface of the photosensitive drum 1. The charging unit 2 rotates in accordance with rotation of the photosensitive drum 1.

A direct current (DC) bias or a DC bias on which an alternating current (AC) is superimposed is applied to the charging unit 2 by a high-voltage power supply (not shown), whereby the photosensitive drum 1 is uniformly charged at a surface potential of −500 V. In the present embodiment, the charging unit 2 employs a contact charging method with a roller. Alternatively, it is also possible to employ a corona charging method or a non-contact charging method. In the non-contact charging method, a roller-shaped charging unit is arranged with keeping a slight distance from the photosensitive drum 1.

After the photosensitive drum 1 is uniformly charged, an exposure unit 3 as a latent-image forming unit exposes the surface of the photosensitive drum 1 to a laser light corresponding to image data, and thereby forming an electrostatic latent image on the photosensitive drum 1. As the exposure unit 3, a laser beam scanner using a laser diode (LD) or a light-emitting diode (LED) is used.

Reference numeral 4 denotes a single-component contact developing unit. A predetermined developing bias is applied to the developing unit 4 by a high-voltage power supply (not shown). With the developing bias, the developing unit 4 develops the electrostatic latent image formed on the photosensitive drum 1 into a toner image. In the present embodiment, a single-component toner of 180 grams (g) is initially contained in the developing unit 4. Alternatively, it is also possible to use a two-component developer instead of the single-component toner.

Reference numeral 10 denotes a process unit in which the photosensitive drum 1, the charging unit 2, and the developing unit 4 are integrally included.

In the image forming apparatus, the four process units 10 are arranged in parallel with one another. The process units 10 respectively form black (K), yellow (Y), magenta (M), and cyan (C) toner images when a full-color image is to be formed. The K, Y, M, and C toner images formed on the photosensitive drums 1 by the process units 10 are sequentially transferred onto an intermediate transfer belt 15, which has contact with the photosensitive drums 1, in this order in a superimposed manner, and thereby forming a full-color image.

The intermediate transfer belt 15 is supported by a secondary-transfer drive roller 21, a metallic cleaning roller 16, four primary-transfer rollers 5, and a tension roller 20. When the drive roller 21 is driven to rotate by a drive motor (not shown), the intermediate transfer belt 15 moves in accordance with the rotation of the drive roller 21. Incidentally, to apply a tension to the intermediate transfer belt 15, an elastic member (not shown) such as a spring is provided to both ends of the tension roller 20 in an axial direction so that an elastic force in a direction of tensing the intermediate transfer belt 15 is applied to the tension roller 20 by the elastic members.

As the tension roller 20, a pipe-shaped aluminum roller of 19 mm in diameter and 231 mm in width is used.

Figure 2:
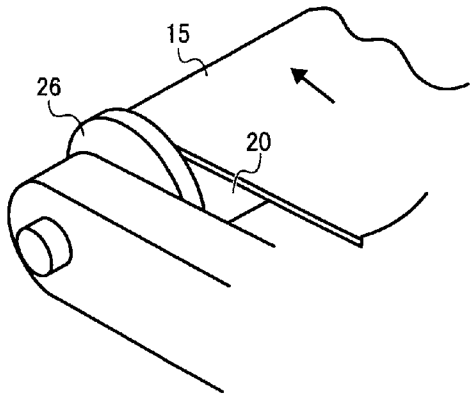
FIG. 2 is a perspective view for explaining a belt-meandering preventing mechanism of the belt device shown in FIG. 1.
Figure 3:
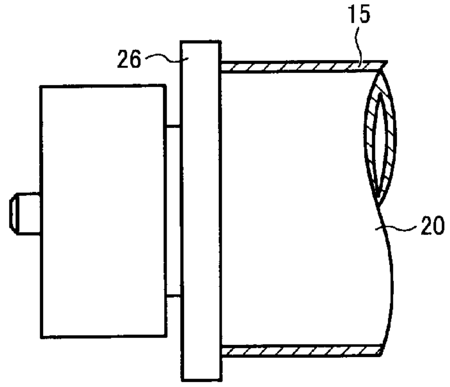
FIG. 3 is a side view of the belt device for explaining the belt-meandering preventing mechanism shown in FIG. 2.

As shown in FIGS. 2 and 3, a flange 26 is provided on both ends of the tension roller 20. A diameter of the flange 26 is 22 mm that is larger than that of the tension roller 20.

If the intermediate transfer belt 15 meanders, an edge of the intermediate transfer belt 15 in the width direction is struck on any of the flanges 26, and thereby preventing the meandering of the intermediate transfer belt 15. Incidentally, the intermediate transfer belt 15 moves in a direction of an arrow shown in FIG. 2.

As the drive roller 21, for example, a roller made of polyurethane rubber (0.3 mm to 1 mm in thickness) or a roller coated with a thin layer (0.03 mm to 0.1 mm in thickness) can be used. In the present embodiment, a roller coated with urethane (0.05 mm in thickness) (19 mm in diameter) is used as the drive roller 21 because a diameter change with the temperature is small.

As the primary-transfer roller 5, for example, a conductive blade, a conductive sponge roller, or a metal roller can be used. In the present embodiment, a metal roller of 8 mm in diameter is used as the primary-transfer roller 5. Each of the primary-transfer rollers 5 is arranged to be opposed to the corresponding photosensitive drum 1 across the intermediate transfer belt 15 in such a manner that a center axis of the primary-transfer roller 5 is shifted from that of the photosensitive drum 1 by 8 mm in a moving direction of the intermediate transfer belt 15, and a top portion of the primary-transfer roller 5 is shifted upward by 1 mm from a bottom portion of the photosensitive drum 1 in a vertical direction. Alternatively, each of the primary-transfer rollers 5 can be arranged to be opposed to the corresponding photosensitive drum 1 in such a manner that the center axis of the primary-transfer roller 5 is located on a perpendicular line extending from the center axis of the photosensitive drum 1. Furthermore, a corona transfer unit can be used as the primary-transfer roller 5.

The primary-transfer rollers 5 are respectively arranged to be opposed to the photosensitive drums 1 across the intermediate transfer belt 15. A predetermined transfer bias of +500 V to +1000 V is applied to each of the primary-transfer rollers 5 in common by a single high-voltage power supply (not shown).

By the application of the transfer bias, a transfer electric field is formed between each of the primary-transfer rollers 5 and each of the photosensitive drums 1 via the intermediate transfer belt 15. As a result, the toner images formed on the photosensitive drums 1 are electrostatically transferred onto the intermediate transfer belt 15.

As shown in FIG. 1, the image forming apparatus further includes a toner-mark detecting sensor 17. The toner-mark detecting sensor 17 detects a toner mark formed on the intermediate transfer belt 15. The toner mark is used for checking a toner concentration or determining a transfer position. The toner-mark detecting sensor 17 is a specular reflective optical sensor or a diffuse reflective optical sensor, and is installed on a toner-mark detecting sensor installation member 17A arranged near the tension roller 20. Depending on a result of the detection by the toner-mark detecting sensor 17, an image density or a color registration (a position alignment) is controlled.

Reference numeral 32 denotes an intermediate-transfer-belt cleaning unit. The intermediate-transfer-belt cleaning unit 32 includes a cleaning blade 31, and cleans the intermediate transfer belt 15 by scraping off a transfer residual toner from the intermediate transfer belt 15 with the cleaning blade 31. Instead of the cleaning blade 31, a cleaning roller or a cleaning brush can be used.

The cleaning blade 31 is made of polyurethane rubber having a thickness of 1.5 mm to 3 mm and a rubber hardness of 65 degrees to 80 degrees. The cleaning blade 31 is arranged to be in contact with the intermediate transfer belt 15 in a counter direction to the moving direction of the intermediate transfer belt 15. The scraped transfer residual toner is conveyed to a waste toner container 33 through a waste toner path (not shown), and contained in the waste toner container 33.

At the time of assembling the image forming apparatus, a lubricant such as zinc stearate is applied to at least any one of a cleaning nip portion of the intermediate transfer belt 15 between the cleaning blade 31 and the cleaning roller 16 and an edge portion of the cleaning blade 31. Therefore, it is possible to prevent the cleaning blade 31 from being ridden up at the cleaning nip portion. In addition, a dam layer is formed by the lubricant at the cleaning nip portion, so that the cleaning performance can be improved.

Both end faces of the rollers supporting the intermediate transfer belt 15 are supported by side plates (not shown) from the sides of the both edges of the intermediate transfer belt 15, respectively.

The intermediate transfer belt 15 is an endless belt made of a resin film in which a conductive material such as carbon black is dispersed in, for example, polyvinylidine difluoride (PVDF), ethylene tetrafluoroethylene (ETFE), polyimide (PI), polycarbonate (PC), thermoplastic elastomer (TPE), and the like. In the present embodiment, a belt that has a single layer structure in which carbon black is added to TPE having modulus of elongation of 1000 MPa to 2000 MPa, a thickness of 90 μm to 160 μm, and a width of 230 mm is used as the intermediate transfer belt 15.

Under the conditions of a temperature of 23° C. and 50% relative humidity, a volume resistivity of the intermediate transfer belt 15 is preferably in a range of $10^8$ Ω·cm to $10^{11}$ Ω·cm, and a surface resistivity of the intermediate transfer belt 15 is preferably in a range of $10^8$ Ω/sq to $10^{11}$ Ω/sq (both measurements are made at an applied voltage of 500 V for an application time of 10 seconds with Hiresta-UP MCP-HT450 manufactured by Mitsubishi Chemical Corporation).

When both the volume resistivity and the surface resistivity of the intermediate transfer belt 15 exceed the above ranges, the intermediate transfer belt 15 is charged. Therefore, as the intermediate transfer belt 15 moves toward the downstream side of which the toner images are sequentially transferred onto the intermediate transfer belt 15, a higher voltage needs to be set. Thus, it is difficult for the single high-voltage power supply to supply an appropriate voltage to each of the primary-transfer rollers 5. This is because a charged potential of the surface of the intermediate transfer belt 15 is increased by an electric discharge occurring in the transfer process or the transfer-medium separating process, so that the intermediate transfer belt 15 has difficulty in a self-discharge. To prevent such a phenomenon, it is necessary to provide an electricity removing device that removes an electricity from the intermediate transfer belt 15. On the other hand, when the volume resistivity and the surface resistivity of the intermediate transfer belt 15 drop below the above ranges, a decrease of the charged potential is accelerated, so that the intermediate transfer belt 15 has no difficulty in the self-discharge. However, in this case, a toner is scattered due to a flow of a current in a surface direction when a toner image is transferred onto the intermediate transfer belt 15. Therefore, the volume resistivity and the surface resistivity of the intermediate transfer belt 15 are preferably within the above ranges.

Reference numeral 25 denotes a secondary-transfer roller. The secondary-transfer roller 25 is a roller that a metal cored bar of 6 mm in diameter, which is made by, for example, steel use stainless (SUS), is coated with an elastic medium such as urethane adjusted to have a resistance in a range of 106Ω to $10^{10}$Ω by a conductive material so that the secondary-transfer roller 25 is formed to have a diameter of 19 mm and a width of 222 mm. Specifically, an ion-conductive roller (made by urethane in which carbon is dispersed, acrylonitrile butadiene rubber (NBR), and hydrin), an electronically conductive roller (made by ethylene propylene dieneterpolymers (EPDM)), or the like can be used as the secondary-transfer roller 25. In the present embodiment, a urethane roller having an Asker C hardness of 35 degrees to 50 degrees is used as the secondary-transfer roller 25. When a resistance of the secondary-transfer roller 25 exceeds the above range, it is difficult to flow a sufficient current into the secondary-transfer roller 25. Therefore, to obtain a sufficient transfer efficiency, a higher voltage needs to be applied to the secondary-transfer roller 25, and thus a cost of power supply is increased. In addition, by the application of the higher voltage, an electric discharge occurs in a space around a transfer nip portion, so that a white spot is generated on a halftone image due to the electric discharge. Such a defect occurs prominently in the conditions of low temperature and low humidity (for example, in the conditions of a temperature of 10° C. and 15% relative humidity). On the other hand, when a resistance of the secondary-transfer roller 25 drops below the above range, it is not possible to achieve sufficient transfer efficiencies for both a color image (such as superimposed three-color toner images) and a monochrome image to be formed on the same sheet. This is because the resistance of the secondary-transfer roller 25 is low, so that a sufficient current for the transfer of the monochrome image requiring a relatively low voltage can be flown. However, the transfer of the color image requires a higher voltage than the voltage appropriate to the monochrome image. If a voltage is set to be appropriate to the color image, an excess current for the transfer of the monochrome image is flown, and thereby causing a decrease of the transfer efficiency for the monochrome image.

Incidentally, a resistance of the secondary-transfer roller 25 is measured in such conditions that the secondary-transfer roller 25 is installed on a conductive metal plate, and a load of 4.9 N is applied to both ends of the cored bar. The resistance of the secondary-transfer roller 25 is obtained based on a current flown thereinto when a voltage of 1 kV is applied to a portion between the cored bar and the metal plate. As the secondary transfer method, it is also possible to employ a corona transfer method using a corona instead of the secondary-transfer roller 25.

A transfer medium 22 such as a sheet is contained in a containing unit such as a sheet cassette. The transfer medium 22 is fed from the containing unit by a sheet feed roller 23 and a pair of registration rollers 24 in synchronization with a timing at which a leading end of the toner image formed on the surface of the intermediate transfer belt 15 comes to a secondary transfer position. A predetermined transfer bias is applied to the transfer medium 22 by a high-voltage power supply (not shown), whereby the toner image is transferred from the intermediate transfer belt 15 onto the transfer medium 22. The image forming apparatus according to the present embodiment employs a longitudinally-extending path as a sheet path. The transfer medium 22 is separated from the intermediate transfer belt 15 by the use of the curvature of the secondary-transfer drive roller 21. After the toner image transferred onto the transfer medium 22 is fixed thereon by a fixing unit 40, the transfer medium 22 is discharged from the image forming apparatus.

In the present embodiment, the fixing unit 40 is configured to change a processing speed depending on a type of the transfer medium 22. Specifically, when the transfer medium 22 has a basis weight of 100 $g/m^2$ or more, the processing speed is reduce by half as compared with a normal processing speed. Namely, it takes the transfer medium 22 twice as long to pass through a fixing nip formed between a pair of fixing rollers included in the fixing unit 40 as compared with a case of the normal processing speed. Therefore, the toner image can be reliably fixed on the transfer medium 22.

In the image forming apparatus with such a configuration, when the intermediate transfer belt 15 meanders, the edge of the intermediate transfer belt 15 in the width direction is struck on any of the flanges 26 provided on the ends of the tension roller 20. Therefore, it is possible to prevent the meandering of the intermediate transfer belt 15. In the present embodiment, a buckling-distortion preventing mechanism is provided to prevent a buckling distortion of the intermediate transfer belt 15 that may occur when the edge of the intermediate transfer belt 15 is struck on the flange 26.

Figure 4:
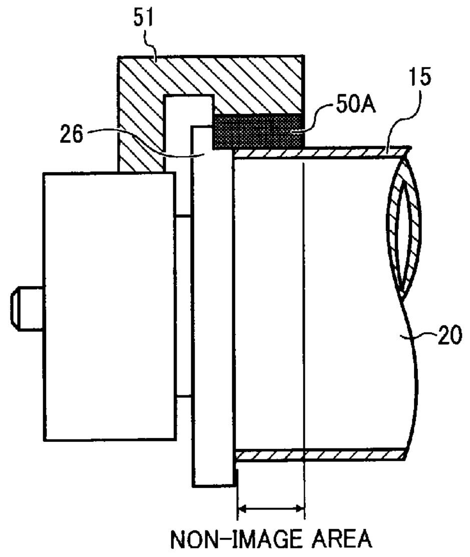
FIG. 4 is a side view for explaining a buckling-distortion preventing mechanism provided to the belt device shown in FIG. 3.

FIG. 4 is a schematic diagram for explaining the buckling-distortion preventing mechanism. As the buckling-distortion preventing mechanism, a pressing member 50A supported by a holder 51 is arranged on an end portion of the intermediate transfer belt 15 in abutting contact with the flange 26.

Specifically, the pressing member 50A is arranged just before a position where the intermediate transfer belt 15 has contact with an outer circumferential surface of the tension roller 20 in a rotating direction of the tension roller 20, i.e., at a position where the pressing member 50A can press the surface of the intermediate transfer belt 15 in a thickness direction with respect to an extended surface of the intermediate transfer belt 15 on the upstream side of the position where the intermediate transfer belt 15 has just contact with the tension roller 20 in the rotating direction.

Therefore, the intermediate transfer belt 15 is pressed by the pressing member 50A, so that the intermediate transfer belt 15 can be prevented from an undulation corresponding to ruffling.

Figure 5A:
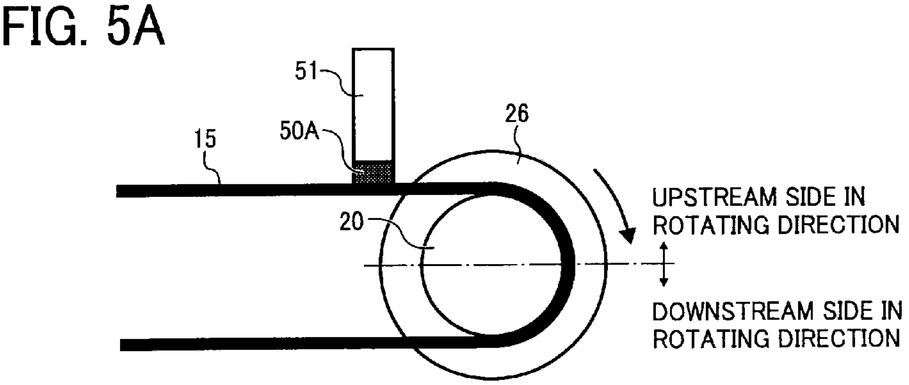
FIGS. 5A and 5B are respectively a side view and a plan view of the belt device for explaining a layout of a pressing member shown in FIG. 4.
Figure 5B:
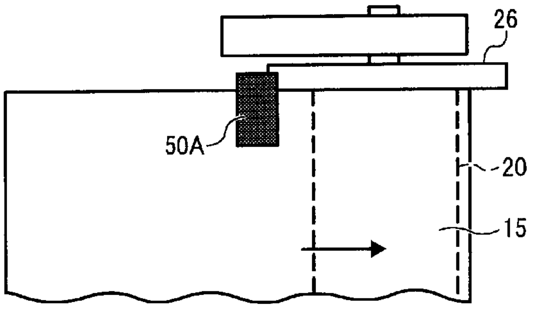

As shown in FIG. 5B, the pressing member 50A is arranged on the upstream side of the tension roller 20 in the rotating direction in such a manner that an end portion of the pressing member 50A protrudes from the edge of the intermediate transfer belt 15 in the width direction to be parallel to the width direction of the intermediate transfer belt 15, and extends from a position where the flange 26 is in abutting contact with the edge of the intermediate transfer belt 15 to the inner side of the intermediate transfer belt 15 in the width direction, which is parallel to an axial direction of the tension roller 20.

The reason why the end portion of the pressing member 50A protrudes from the edge of the intermediate transfer belt 15 is explained below.

If the pressing member 50A does not protrude from the edge of the intermediate transfer belt 15, it is not possible to prevent the ruffling of the edge of the intermediate transfer belt 15. In a state where the edge of the intermediate transfer belt 15 is rolled back, if the intermediate transfer belt 15 is struck on the flange 26, the intermediate transfer belt 15 may be run on to the flange 26, which resulting in a buckling distortion of the intermediate transfer belt 15. Therefore, the pressing member 50A is arranged so that the end portion of the pressing member 50A protrudes from the edge of the intermediate transfer belt, whereby the intermediate transfer belt 15 can stably move along the flange 26. As a result, when the edge of the intermediate transfer belt 15 is struck on the flange 26, it is possible to prevent the intermediate transfer belt 15 from being run on the flange 26 more effectively.

Furthermore, as shown in FIG. 4, the pressing member 50A is arranged on a non-image area of the intermediate transfer belt 15 where no image is carried in the width direction of the intermediate transfer belt 15 parallel to the axial direction of the tension roller 20. To avoid countering the movement of the intermediate transfer belt 15 when the pressing member 50A presses the surface of the intermediate transfer belt 15, the pressing member 50A is composed of a slidable member allowing the intermediate transfer belt 15 to move smoothly.

The pressing member 50A is made of resin having a sliding property, such as sliding polyoxymethylene (POM) and sliding acrylonitrile butadiene styrene (ABS), a sliding sponge, felt, or the like. A horizontal width of a pressing surface of the pressing member 50A to be pressed against the intermediate transfer belt 15 in the width direction is 2 mm to 5 mm because it is necessary to save space on the intermediate transfer belt 15 for 210 mm for a horizontal width of an A4-size sheet or 216 mm for a horizontal width of a letter-size sheet.

As described above, the pressing member 50A is arranged on the upstream side of the position where the intermediate transfer belt 15 has just contact with the outer circumferential surface of the tension roller 20 in the rotating direction of the tension roller 20, so that the pressing member 50A is located on the side capable of pulling the intermediate transfer belt 15, i.e., on the side capable of generating a tension with respect to the intermediate transfer belt 15. Therefore, the tension generated by the press force of the pressing member 50A is added to the tension generated because the intermediate transfer belt 15 is supported by the rollers, so that the intermediate transfer belt 15 can be in close contact with the outer circumferential surface of the tension roller 20, and also a force in a direction of the tension against a force in a direction of causing a buckling distortion of the intermediate transfer belt 15 can be increased. Therefore, it is possible to prevent an occurrence of the buckling distortion of the intermediate transfer belt 15.

Figure 6:
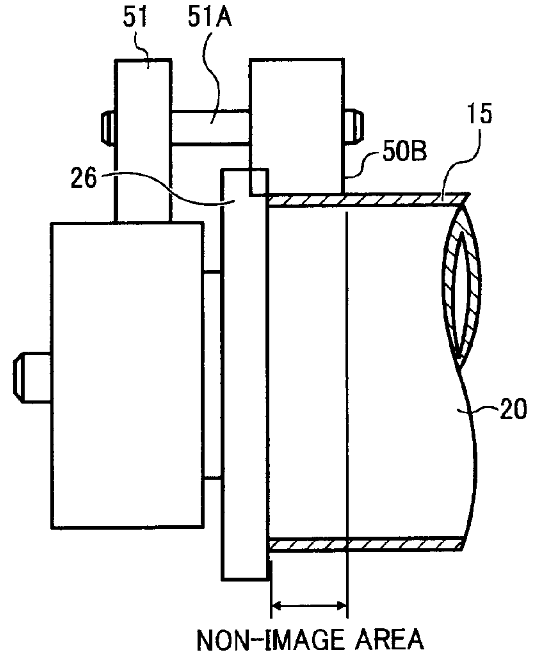
FIG. 6 is a side view of the belt device for explaining a pressing member according to a first modified example of the pressing member shown in FIGS. 5A and 5B.

FIG. 6 is a schematic diagram for explaining a pressing member 50B as a first modified example of the pressing member 50A. The pressing member 50B is composed of a roller capable of rotating with pressing the intermediate transfer belt 15.

A shaft 51A is rotatably supported by the holder 51, and penetrates through the pressing member 50B so that the pressing member 50B can rotate. The pressing member 50B rotates in conjunction with the movement of the intermediate transfer belt 15. The pressing member 50B is made of resin having a high sliding property, such as sliding POM or sliding ABS, so as not to inhibit the movement of the intermediate transfer belt 15. A horizontal width of the pressing member 50B in contact with the intermediate transfer belt 15 is 2 mm to 5 mm.

Figure 7:
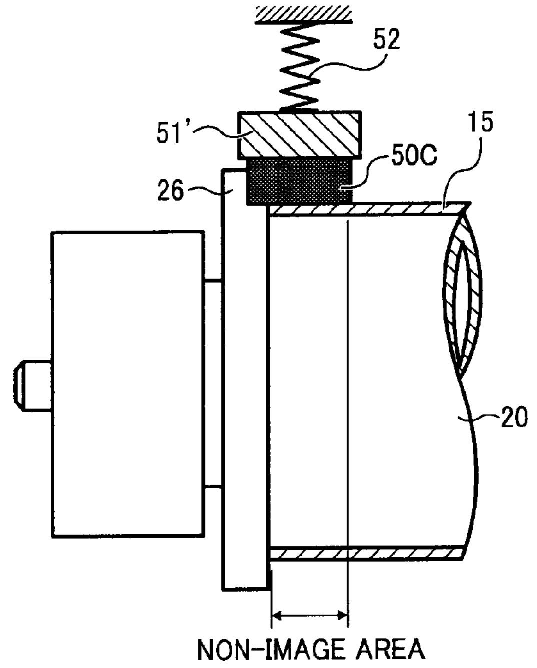
FIG. 7 is a side view of the belt device for explaining a pressing member according to a second modified example of the pressing member shown in FIGS. 5A and 5B.

FIG. 7 is a schematic diagram for explaining a pressing member 50C as a second modified example of the pressing member 50A.

The pressing member 50C is rotatably supported by a holder 51'. The pressing member 50C is pressed against the surface of the intermediate transfer belt 15 by the action of an elastic medium 52, such as a spring, pressing the holder 51'. The pressing member 50C is made of resin having a high sliding property, such as sliding POM or sliding ABS. A horizontal width of the pressing member 50C in contact with the intermediate transfer belt 15 is 2 mm to 5 mm. The pressing member 50C is pressed against the intermediate transfer belt 15 by the pressing force of 1 N to 10 N applied by the elastic medium 52.

In this manner, in the present embodiment, the intermediate transfer belt 15 is pressed by any of the pressing members 50A to 50C at the position where the intermediate transfer belt 15 has just contact with the tension roller 20 in the rotating direction of the tension roller 20. Therefore, the intermediate transfer belt 15 can be in close contact with the outer circumferential surface of the tension roller 20, and also the tension applied to the intermediate transfer belt 15 can be increased, so that it is possible to prevent a buckling distortion of the intermediate transfer belt 15. Especially, unlike such a configuration that a pressing member just presses a top surface of a belt to prevent the belt from being lifted up at the time of controlling a meandering of the belt, in the present embodiment, with such a simple configuration that a tension against a force in a direction of causing a buckling distortion of the belt is increased, the buckling distortion can be prevented, and thus the durability of the belt can be improved. Consequently, it is possible to prevent a factor for a cost increase occurring when a mechanical property of the belt is changed. Furthermore, the buckling distortion is prevented at the time of controlling a meandering of the belt. Therefore, it is possible to prevent a misalignment of toner images to be transferred, and thus an occurrence of a defect image due to, for example, a color registration error can be reliably prevented.

Subsequently, a belt device according to another embodiment of the present invention is explained in detail below with reference to FIGS. 8A and 8B. The portions identical to those for the present embodiment are denoted with the same reference numerals, and the description of those portions is omitted.

In the present embodiment, the intermediate transfer belt 15 is pressed by two pressing members, i.e., the pressing member 50A and a pressing member 50A'. The pressing member 50A is arranged on the upstream side of the position where the intermediate transfer belt 15 has just contact with the outer circumferential surface of the tension roller 20 in the rotating direction of the tension roller 20 in the same manner as that is shown in FIG. 4, and presses the extended surface of the intermediate transfer belt 15. The pressing member 50A' is arranged around the edge of the intermediate transfer belt 15 in abutting contact with the flange 26, and presses a portion of the intermediate transfer belt 15 from the edge of the intermediate transfer belt 15 in abutting contact with the flange 26 to the inner side of the intermediate transfer belt 15 in the axial direction of the tension roller 20.

The pressing members 50A and 50A' are slidably supported by the holders 51 and 511, respectively. The pressing members 50A and 50A' are made of resin having a sliding property, such as sliding POM and sliding ABS, a sliding sponge, felt, or the like.

A pressing force of each of the pressing members 50A and 50A' to be applied to the intermediate transfer belt 15 is different from each other. In the present embodiment, a pressing force of the pressing member 50A is set to be smaller than that of the pressing member 50A'.

This is because a buckling distortion of the intermediate transfer belt 15 tends to occur in the position where the flange 26 in abutting contact with the edge of the intermediate transfer belt 15 more frequently as compared with the position where the pressing member 50A presses the extended surface of the intermediate transfer belt 15. Namely, when the edge of the intermediate transfer belt 15 is struck on the flange 26, a reaction force from the flange 26 is exerted on the intermediate transfer belt 15, and thereby occurring the buckling distortion more frequently. Therefore, in the present embodiment, the pressing force of the pressing member 50A' located at the position where the buckling distortion tends to occur more frequently is set to be larger than that of the pressing member 50A so as to prevent an occurrence of the buckling distortion. In other words, the pressing member 50A' serves to improve the section stiffness of the intermediate transfer belt 15, and increases a buckling stress generated when the edge of the intermediate transfer belt 15 is struck on the flange 26.

Consequently, with such a simple configuration, unlike a particular measure such as an improvement of the stiffness of the belt, it is possible to improve the durability of the belt and prevent an occurrence of a defect image without increasing a cost.

Figure 8A:
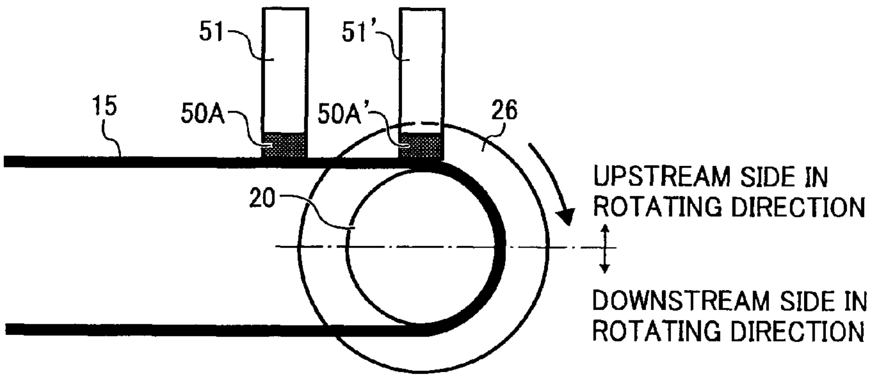
FIGS. 8A and 8B are respectively a side view and a plan view for explaining main elements of a belt device according to another embodiment of the present invention.
Figure 8B:
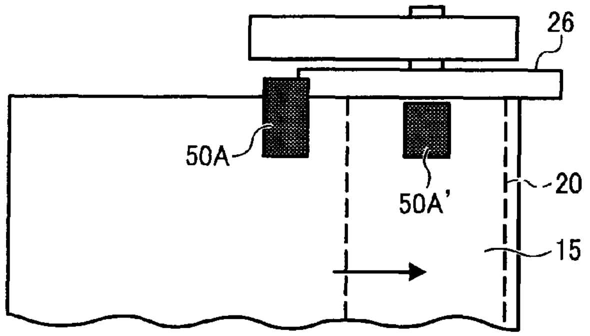
Figure 9:
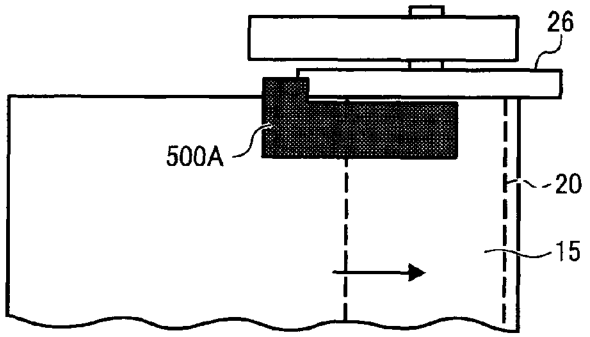
FIG. 9 is a plan view of the belt device for explaining a pressing member according to a first modified example of pressing members shown in FIGS. 8A and 8B.

FIG. 9 is a plan view for explaining a pressing member 500A as a first modified example of the pressing members 50A and 50A' shown in FIGS. 8A and 8B. The pressing member 50A is an example that the pressing members 50A and 50A' are integrated thereinto.

Incidentally, when the pressing members have a roller shape as the pressing member 50A shown in FIG. 6, each of the pressing members is configured to have a different external diameter from each other, so that the pressing members can differ in a pressing force. When each of the pressing members is pressed by the elastic medium 52 as the pressing member 50C shown in FIG. 7, the elastic medium 52 located on both ends of the intermediate transfer belt 15 in the width direction is configured to apply a different elastic force (for example, a constant of spring), so that the pressing members can differ in a pressing force. When a plurality of the pressing members are provided as the pressing members 50A and 50A' shown in FIGS. 8A and 8B, any one of the pressing members (corresponding to the pressing member 50A' in FIGS. 8A and 8B) is arranged to be opposed to the tension roller 20 across the intermediate transfer belt 15, and the other pressing members (corresponding to the pressing member 50A in FIGS. 8A and 8B) are arranged not to be opposed to the tension roller 20, so that the pressing members can differ in a pressing force.

In this manner, in the present embodiment, a tension applied to the intermediate transfer belt 15 is increased by the pressing member 50A pressing the extended surface of the intermediate transfer belt 15, and thereby being against a force causing a buckling distortion of the intermediate transfer belt 15. Furthermore, a buckling distortion of the intermediate transfer belt 15 caused by a reaction force from the flange 26 that is generated when the edge of the intermediate transfer belt 15 is struck on the flange 26 can be prevented by the pressing member 50A' pressing the portion of the intermediate transfer belt 15 around the edge of the intermediate transfer belt 15 in abutting contact with the flange 26. Therefore, the intermediate transfer belt 15 can be kept in a state where the intermediate transfer belt 15 has little buckling distortion. Consequently, it is possible to improve the durability of the intermediate transfer belt 15 and prevent an occurrence of a defect image.

Figure 10:
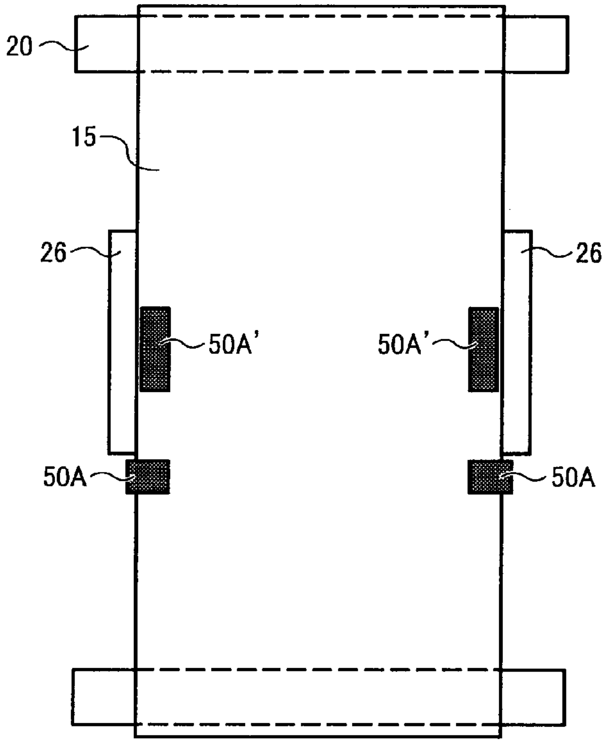
FIG. 10 is a plan view of the belt device for explaining pressing members according to a second modified example of the pressing members shown in FIGS. 8A and 8B.

Incidentally, in the above embodiments, the flange 26 is integrally attached to the tension roller 20. Alternatively, as shown in FIG. 10, the flange 26 can be provided at a different position from the tension roller 20. In this case, the pressing member 50A is arranged so as to press the extended surface of the intermediate transfer belt 15, and the pressing member 50A' is arranged so as to press the portion of the intermediate transfer belt 15 around the edge of the intermediate transfer belt 15 in abutting contact with the flange 26.

Incidentally, the belt device according to the embodiments can be applied to not only the intermediate transfer belt as described above but also, for example, a latent image carrier such as a photosensitive element and a belt for conveying a transfer medium.

Subsequently, how a pressing member 50 is attached to a belt device is explained below. The portions identical to those for the above embodiments are denoted with the same reference numerals, and the description of those portions is omitted.

Figure 11:
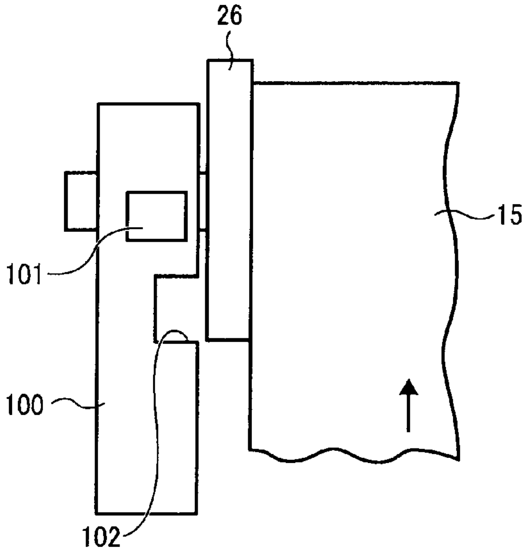
FIGS. 11 and 12 are respectively a plan view and a side view for explaining how a pressing member is attached to the belt device according to the embodiments.
Figure 12:
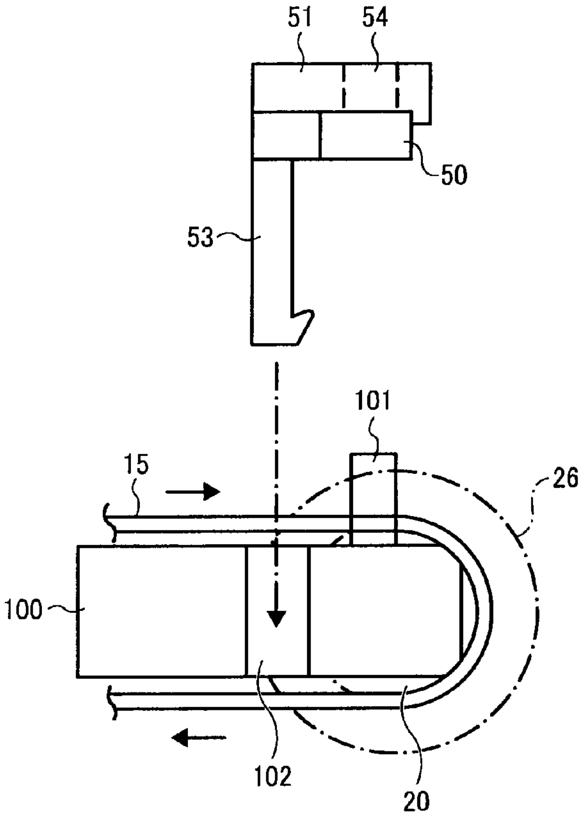
Figure 13:
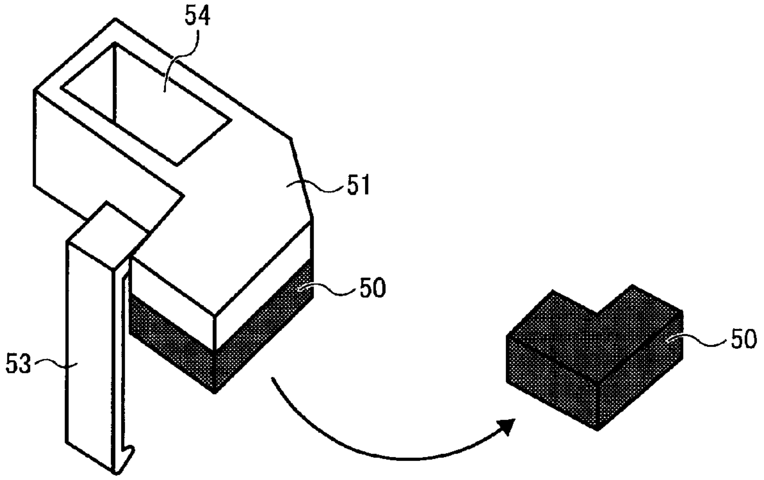
FIG. 13 is a detailed diagram for explaining a state where the pressing member is attached to the belt device shown in FIG. 12.

As shown in FIGS. 11 and 12, a boss (a projection portion) 101 and a groove (an engaging portion) 102 are formed on a tension-roller holder 100. The groove 102 is located on the upstream side of the boss 101 in the moving direction of the intermediate transfer belt 15.

On the other hand, as shown in FIG. 12, an engaging portion 53 and a fitting portion 54 are formed on the pressing-member holder 51. The engaging portion 53 is engaged with a lower end of the groove 102. The fitting portion 54 is fitted with the boss 101. Incidentally, the engaging portion 53 and the fitting portion 54 can be integrally-molded on the pressing-member holder 51, or formed separately from the pressing-member holder 51 and attached to the pressing-member holder 51 later.

It is assumed that an end portion of the pressing member 50 located on the upstream side in the moving direction of the intermediate transfer belt 15 protrudes from the edge of the intermediate transfer belt 15 as the pressing member 500A shown in FIG. 9. Furthermore, it is assumed that the other end portion of the pressing member 50 located on the downstream side in the moving direction of the intermediate transfer belt 15 is opposed to the tension roller 20 across the intermediate transfer belt 15. Alternatively, the pressing member 50 can be configured as any of the pressing members 50B, 50C, and a pair of the pressing members 50A and 50A' shown in FIGS. 6 to 8.

When the belt device is assembled, first, the intermediate transfer belt 15 is put on a plurality of supporting rollers including the tension roller 20 to be supported thereby. Then, as shown in FIG. 12, the pressing member 50 and the pressing-member holder 51 are attached to the belt device in such a manner that the boss 101 on the tension-roller holder 100 is fitted in the fitting portion 54. The engaging portion 53 on the pressing-member holder 51 is engaged with the lower end of the groove 102 on the tension-roller holder 100, and thus the pressing member 50 is set up at a predetermined position.

While the belt device is running, a frictional force is exerted on the pressing member 50 due to the movement of the intermediate transfer belt 15, so that a moment in a counterclockwise direction is exerted on the pressing-member holder 51. However, the boss 101 is fitted in the fitting portion 54 on the pressing-member holder 51, i.e., the pressing-member holder 51 is fixed to the tension-roller holder 100. Therefore, the pressing-member holder 51 is prevented from being dropped out of the tension-roller holder 100.

With such an assembling, the pressing member 50 and the pressing-member holder 51 can be attached to the tension-roller holder 100 in a snap-fit manner. In this manner, the belt device can be easily assembled without any screw or the like, and also can prevent a buckling distortion of the edge of the belt.

As described above, according to an aspect of the present invention, in a configuration in which a bias of an edge of a belt is prevented by an abutting member, when the belt has just contact with an outer circumferential surface of a roller in a rotating direction of the roller, an extended surface of the belt is configured to be pressed by a pressing member. Therefore, by the action of a reaction force from the abutting member, it is possible to prevent a buckling distortion of the edge of the belt in abutting contact with the abutting member.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A belt device, comprising:

a belt that is supported by a plurality of rollers, and is driven to rotate in a predetermined direction, the rollers including a first roller;

an abutting member that makes contact with at least one edge of the belt in a width direction of the belt; and a pressing member that applies a pressure on an extended surface of the belt in a thickness direction of the belt at a position near a contact portion of the belt with the abutting member and on an upstream side of the contact portion in a moving direction of the belt, wherein the pressing member applies the pressure to the extended surface of the belt so as to resist a lateral movement of the belt.

2. The belt device according to claim 1, wherein the pressing member applies a pressure on the extended surface of the belt in the thickness direction on an upstream side of the first roller in a rotating direction of the first roller corresponding to a side where the belt starts to make contact with an outer circumferential surface of the first roller.

3. The belt device according to claim 1, wherein the pressing member applies a pressure on the extended surface of the belt at least before a position where the belt starts to make contact with an outer circumferential surface of the first roller.

4. The belt device according to claim 1, wherein the pressing member is arranged at least before a position where the belt starts to make contact with an outer circumferential surface of the first roller in a rotating direction of the first roller such that the pressing member extends from a position where the edge of the belt is in contact with the abutting member to an inner side of the belt in an axial direction of the first roller.

5. The belt device according to claim 1, wherein when the pressing member applies the pressure on the extended surface of the belt on an upstream side of a position where the belt starts to make contact with an outer circumferential surface of the first roller in a rotating direction of the first roller, one end portion of the pressing member protrudes from the edge of the belt in the width direction parallel to an axial direction of the first roller.

6. The belt device according to claim 1, wherein the pressing member includes a first pressing member and a second pressing member, the first pressing member applies a pressure on the extended surface of the belt on an upstream side of a position where the belt starts to make contact with an outer circumferential surface of the first roller in a rotating direction of the first roller, and the second pressing member presses on a portion of the extended surface of the belt from a position where the edge of the belt is in contact with the abutting member to an inner side of the belt in an axial direction of the first roller near the contact portion of the belt in contact with the abutting member.

7. The belt device according to claim 6, wherein a pressing force of the first pressing member is smaller than that of the second pressing member.

8. The belt device according to claim 6, wherein a space is provided between the first pressing member and the first roller across the belt.

9. The belt device according to claim 1, wherein a contact portion of the pressing member in contact with the belt is composed of a slidable member so that the belt moves smoothly.

10. The belt device according to claim 9, wherein at least the contact portion of the pressing member is made of felt.

11. The belt device according to claim 1, wherein the first roller is located at an upstream end of the belt and the abutting member is located near the upstream end of the belt.

12. The belt device according to claim 1, wherein the abutting member is attached to the first roller.

13. An image forming apparatus, comprising:

a belt device including a belt that is supported by a plurality of rollers, and is driven to rotate in a predetermined direction, the rollers including a first roller, an abutting member that makes contact with at least one edge of the belt in a width direction of the belt, and a pressing member that applies a pressure on an extended surface of the belt in a thickness direction of the belt at a position near a contact portion of the belt with the abutting member and on an upstream side of the contact portion in a moving direction of the belt, wherein the pressing member applies the pressure to the extended surface of the belt so as to resist a lateral movement of the belt.

14. A belt device, comprising:

a belt that is supported by a plurality of rollers, and is driven to rotate in a predetermined direction, the rollers including a first roller;

an abutting member that makes contact with at least one edge of the belt in its width direction; and a pressing member that applies a pressure on an extended surface of the belt in its thickness direction at a position near a contact portion of the belt with the abutting member and on an upstream side of the contact portion in its moving direction, wherein when the pressing member applies the pressure on the extended surface of the belt on an upstream side of a position where the belt starts to make contact with an outer circumferential surface of the first roller in its rotating direction, one end portion of the pressing member protrudes from the edge of the belt in the width direction parallel to an axial direction of the first roller.

* * * * *